(12) United States Patent
Levi et al.

(10) Patent No.: US 10,878,310 B2
(45) Date of Patent: Dec. 29, 2020

(54) ACCELERATED CONVOLUTION IN CONVOLUTIONAL NEURAL NETWORKS

(71) Applicant: Mellanox Technologies, Ltd., Yokneam (IL)

(72) Inventors: Dotan Levi, Kiryat Motzkin (IL); Tal Anker, Ramat Gan (IL); Ohad Markus, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 524 days.

(21) Appl. No.: 15/813,181

(22) Filed: Nov. 15, 2017

(65) Prior Publication Data

US 2018/0150741 A1 May 31, 2018

Related U.S. Application Data

(60) Provisional application No. 62/427,162, filed on Nov. 29, 2016.

(51) Int. Cl.
| | | |
|---|---|---|
| *G06N 3/04* | (2006.01) | |
| *G06N 3/08* | (2006.01) | |
| *G06N 3/063* | (2006.01) | |

(52) U.S. Cl.
CPC ......... *G06N 3/0454* (2013.01); *G06N 3/0481* (2013.01); *G06N 3/063* (2013.01); *G06N 3/08* (2013.01); *G06T 2207/20084* (2013.01)

(58) Field of Classification Search
CPC ...... G06N 3/04; G06N 3/0454; G06N 3/0481; G06N 3/06; G06N 3/063; G06F 17/15; G06F 17/153; G06F 17/16; G06F 7/5443

USPC .................................................. 708/315, 603
See application file for complete search history.

(56) References Cited

U.S. PATENT DOCUMENTS

| | | | |
|---|---|---|---|
| 2017/0103316 A1 | 4/2017 | Ross et al. | |
| 2018/0005075 A1 | 1/2018 | Shacham et al. | |
| 2018/0046900 A1* | 2/2018 | Dally | G06N 3/0427 |
| 2018/0121795 A1 | 5/2018 | Kato et al. | |
| 2018/0253635 A1* | 9/2018 | Park | G06F 7/535 |
| 2018/0322390 A1* | 11/2018 | Das | G06N 3/0454 |

(Continued)

OTHER PUBLICATIONS

Krizhevky et al., "ImageNet Classification with Deep Convolutional Neural Networks", Advances in Neural Information Processing Systems, 9 pages, year 2012.

(Continued)

*Primary Examiner* — Andrew Caldwell
*Assistant Examiner* — Emily E Larocque
(74) *Attorney, Agent, or Firm* — Kligler & Associates Patent Attorneys Ltd

(57) ABSTRACT

Described embodiments include a system that includes one or more buffers and circuitry. The circuitry is configured to process a plurality of input values, by identifying each of the input values that is not zero-valued, and, for each value of the identified input values, computing respective products of coefficients of a kernel with the value and storing at least some of the respective products in the buffers. The circuitry is further configured to compute a plurality of output values, by retrieving respective sets of stored values from the buffers, at least some of the retrieved sets including one or more of the products, and summing the retrieved sets. The circuitry is further configured to output the computed output values. Other embodiments are also described.

18 Claims, 2 Drawing Sheets

(56) References Cited

U.S. PATENT DOCUMENTS

| | | | |
|---|---|---|---|
| 2018/0357744 A1 | 12/2018 | Pattichis et al. | |
| 2019/0115933 A1* | 4/2019 | Chen | G06F 7/5443 |
| 2019/0180499 A1* | 6/2019 | Caulfield | G06T 15/06 |
| 2019/0205780 A1 | 7/2019 | Sakaguchi | |

OTHER PUBLICATIONS

Zhou et al., "An FPGA-based Accelerator Implementation for Deep Convolutional Neural Networks", 4th International Conference on Computer Science and Network Technology (ICCSNT 2015), pp. 829-832, 2015.

Zhang et al., "Optimizing FPGA-based Accelerator Design for Deep Convolutional Neural Networks", Proceedings of the 2015 ACM/SIGDA International Symposium on Field-Programmable Gate Arrays , pp. 161-170, Feb. 22-24, 2015.

Farabet et al., "An FPGA-Based Stream Processor for Embedded Real-Time Vision with Convolutional Networks", IEEE 12th International Conference on Computer Vision Workshops (ICCV Workshops), 8 pages, Sep. 27-Oct. 4, 2009.

Gschwend ., "An FPGA-Accelerated Embedded Convolutional Neural Network", ZynqNet, Supercomputing Systems AG, Master's Thesis Spring , 41 pages, Aug. 2016.

Ovtcharov et al., "Accelerating Deep Convolutional Neural Networks Using Specialized Hardware", Microsoft Research, 4 pages, Feb. 22, 2015.

Cong., "Machine Learning on FPGAs", HALO'2015 (The First Workshop on Hardware and Algorithms for Learning On-a-Chip) co-located at the International Conference on Computer-Aided Design (ICCAD'15), 32 pages, Austin, USA, Nov. 2-6, 2015.

Farabet et al., "CNP: An FPGA-Based processor for Convolutional networks", 19th International Conference on Field Programmable Logic and Applications, pp. 32-37, Prague, Czech Republic, Aug. 31-Sep. 2, 2009.

Gokhale et al., "A 240 G-ops/s Mobile Coprocessor for Deep Neural Networks", IEEE Conference on Computer Vision and Pattern Recognition Workshops (CVPRW), pp. 682-687, Jun. 24-27, 2014.

Paragkumar et al., "FPGA-based Coprocessor for Deep Convolutional Neural Network Classification", Proceedings of Annual Product Conference, Indian Institute of Science, Bangalore, India, 5 pages, year 2016.

Kfir et al., U.S. Appl. No. 15/716,761, filed Sep. 27, 2017.

Microsoft Research Blog—"Microsoft unveils Project Brainwave for real-time AI", 4 pages, Aug. 22, 2017.

U.S. Appl. No. 15/716,761 Office Action dated Oct. 2, 2020.

* cited by examiner

ACCELERATED CONVOLUTION IN CONVOLUTIONAL NEURAL NETWORKS

CROSS-REFERENCE TO RELATED APPLICATIONS

The present application claims the benefit of U.S. Provisional Application 62/427,162, entitled "Network-Based System and Method for Accelerating Deep Learning Classification," filed Nov. 29, 2016, whose disclosure is incorporated herein by reference.

FIELD OF THE INVENTION

The present invention relates to the field of signal and image processing, and to convolutional neural networks used for deep learning and inference.

BACKGROUND

In the field of artificial intelligence (AI), an artificial neural network (ANN) may be configured to perform a particular inference task, whereby the ANN infers information regarding previously-unseen data, based on prior training. Examples of inference tasks include classification, speech recognition, and object recognition.

A convolutional neural network (CNN) is one type of ANN in which successive convolution operations are performed. In a convolution operation, a convolution kernel, comprising a plurality of coefficients, is used to compute a weighted sum of input values. A convolution kernel may be of any suitable dimensionality and of any suitable size. An example of a CNN is the VGG-16 CNN, developed by the Oxford Visual Geometry Group (VGG), which automatically recognizes objects in an image.

In general, the input to a convolution operation in a CNN may comprise any number of channels. For example, an image input to the first layer of the CNN may comprise three channels—a red channel, a blue channel, and a green channel—such that the image effectively includes three separate two-dimensional images. (For convolution operations at deeper layers of the CNN, even more than three input channels may be present.) The number of channels in the convolution kernel is typically equal to the number of input channels; thus, for example, an input of size N×M×C, where C is the number of channels, may be convolved with a kernel of size K×L×C.

SUMMARY OF THE INVENTION

There is provided, in accordance with some embodiments of the present invention, a system that includes one or more buffers, and circuitry. The circuitry is configured to process a plurality of input values, by identifying each of the input values that is not zero-valued, and, for each value of the identified input values, computing respective products of coefficients of a kernel with the value and storing at least some of the respective products in the buffers. The circuitry is further configured to compute a plurality of output values, by retrieving respective sets of stored values from the buffers, at least some of the retrieved sets including one or more of the products, and summing the retrieved sets. The circuitry is further configured to output the computed output values.

In some embodiments, the circuitry is configured to output at least some of the computed output values before processing all of the input values.

In some embodiments, the circuitry is configured to, in response to a given one of the input values being zero-valued, store a plurality of zeros in the buffers, without multiplying the given one of the input values by any of the coefficients.

In some embodiments, the system further includes an oscillator configured to clock the circuitry, and the circuitry includes:

zero-comparison circuitry, configured to, during a given clock cycle of the oscillator:
  compare a subset of the input values to zero, and
  based on the comparing, identify, in the subset, one or more zero-valued input values, and one or more non-zero-valued input values; and multiplier circuitry, configured to, during the given clock cycle, multiply each of the non-zero-valued input values by the coefficients, without multiplying any of the zero-valued input values by any of the coefficients.

In some embodiments, each buffer of the buffers corresponds to a different respective coefficient of the coefficients, and the circuitry is configured to store each product of the at least some of the products in the buffer corresponding to the coefficient from which the product was computed.

In some embodiments, a number of elements in each of the buffers is less than a number of the output values, and the circuitry is configured to, in storing the at least some of the products for one or more of the input values, overwrite other products that were previously stored by the circuitry.

In some embodiments, the system further includes an oscillator configured to clock the circuitry, and the circuitry includes accumulator circuitry configured to, during a given clock cycle of the oscillator:

retrieve at least one of the sets of stored values from the buffers, by retrieving each of the stored values that is stored at a particular index of a respective one of the buffers, and
  compute at least one of the output values, by summing the retrieved one of the sets.

In some embodiments, each of the input values is derived from an output of a rectified linear unit (ReLU).

In some embodiments, the system further includes a processor configured to perform a machine-learned inference task based on the output values.

In some embodiments, the inference task includes an object-recognition task.

There is further provided, in accordance with some embodiments of the present invention, a method that includes, using circuitry, processing a plurality of input values, by identifying each of the input values that is not zero-valued, and, for each value of the identified input values, computing respective products of coefficients of a kernel with the value and storing at least some of the respective products in one or more buffers. The method further includes computing a plurality of output values, by retrieving respective sets of stored values from the buffers, at least some of the retrieved sets including one or more of the products, and summing the retrieved sets. The method further includes outputting the computed output values.

The present invention will be more fully understood from the following detailed description of embodiments thereof, taken together with the drawings, in which:

DETAILED DESCRIPTION OF EMBODIMENTS

Overview

Figure 1:
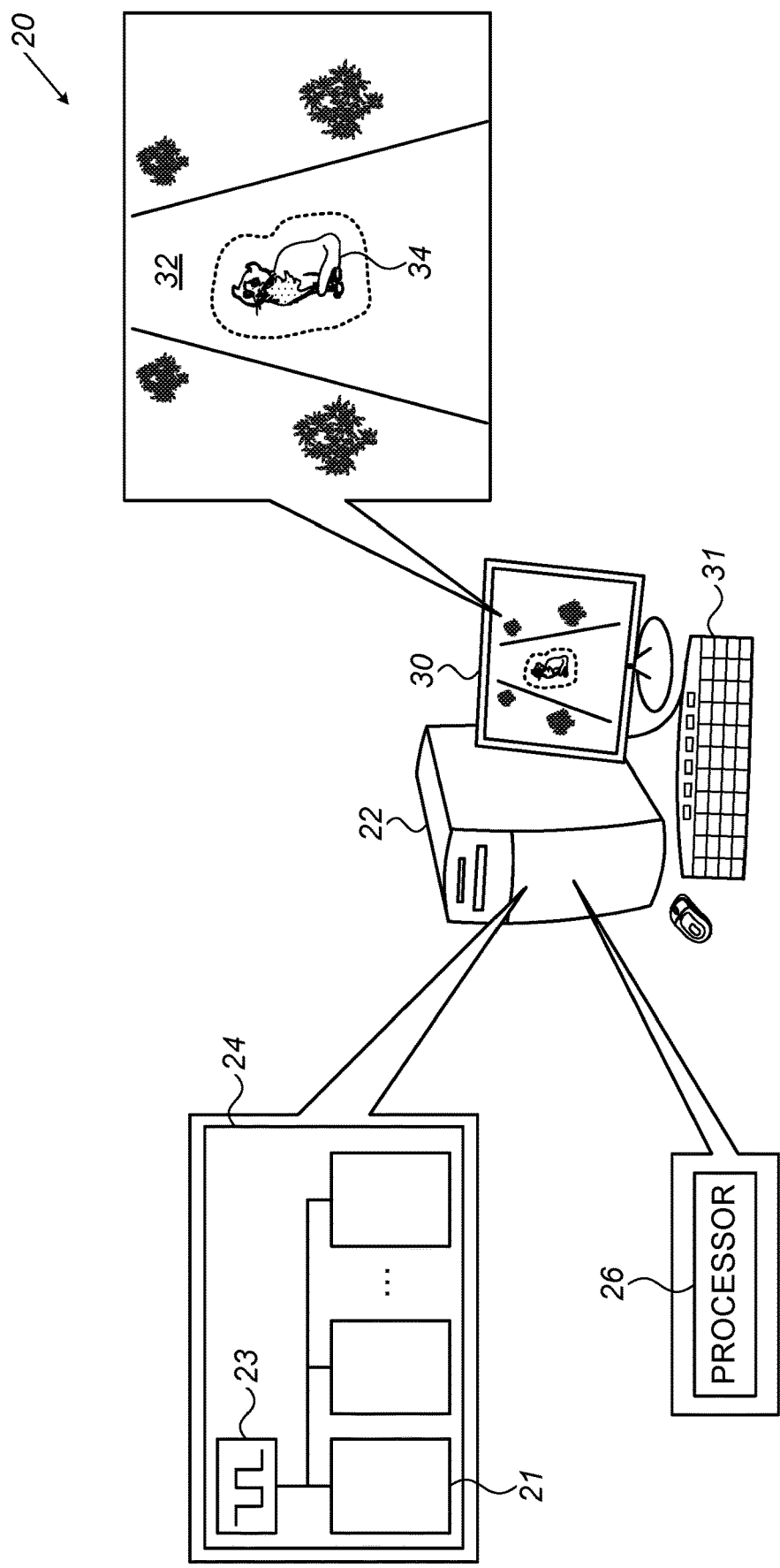
FIG. 1 is a schematic illustration of a system for deep learning and inference, in accordance with some embodiments of the present invention.

When using a conventional CNN for image processing, each convolution operation is performed by passing the kernel over the input image, such that the central coefficient of the kernel is successively aligned with each of the pixels in the image. For each of these kernel positions, each coefficient in the kernel is multiplied by the co-located pixel value (i.e., the pixel value with which the coefficient is aligned), and the resulting products are then summed. Typically, due to the large number, and/or size, of the inputs passed through the CNN, extensive computational resources, and/or a large amount of computing time, are required.

To address this challenge, embodiments of the present invention capitalize on the fact that, in many applications, successive convolution operations in a CNN are separated by a rectified linear unit (ReLU) layer, which nullifies any negative values in the output from the preceding convolution operation. (In other words, each ReLU layer applies, to each input value "x," the function max(0,x).) Due to the ReLU layers, the inputs to each of the convolution operations that follow the first convolution operation typically contain a relatively large number of zeros, which do not contribute to the result of the convolution operation. Embodiments of the present invention therefore perform convolution operations in a manner that reduces the number of redundant multiply-by-zero operations that are performed.

By way of illustration, Table 1 below represents a hypothetical 5×5 image that is output from a ReLU layer. Each value in the table represents the value of a respective pixel in the image. The pixel in the $i^{th}$ row and $j^{th}$ column of the image will be described as being located at index (i-1,j-1), with the top-left corner pixel being at index (0,0).

TABLE 1

| 0 | 100 | 0 | 0 | 50 |
|---|---|---|---|---|
| 0 | 0 | 200 | 0 | 0 |
| 100 | 0 | 0 | 0 | 0 |
| 0 | 0 | 0 | 50 | 0 |
| 0 | 50 | 0 | 0 | 100 |

It will be assumed that this image is to be convolved with a 3×3 kernel. The coefficient in the $m^{th}$ row and $n^{th}$ column of this kernel will be described as being located at index (m-1,n-1), with the top-left corner coefficient being at index (0,0).

To convolve this image with the kernel using a conventional convolution technique, the kernel is passed over the image, such that the central coefficient of the kernel (at index (1,1)) is aligned with each of the 25 pixels in the image. For each of these kernel positions, 9 multiplication operations are performed, in that each kernel coefficient is multiplied by its co-located pixel, and the 9 products are then summed. (Various methods, such as zero-padding of the input image, may be used to handle the edges of the image.) Hence, assuming that the convolution circuitry is capable of performing, during each clock cycle, one set of multiplication operations along with the subsequent addition operation, 25 clock cycles are required to perform the convolution. Given, however, that the vast majority of the pixels in the image are zero-valued, the majority of this processing time is wasted on redundant multiply-by-zero operations.

In embodiments of the present invention, on the other hand, the kernel is not passed over the input. Instead, the convolution operation is split into two operations, which are performed in parallel to one another. In the first operation, the kernel coefficients are multiplied by the non-zero pixels, but not by more than a relatively small number of zero-valued pixels. The resulting products are stored in the appropriate locations in one or more indexed buffers. In the second operation, the output pixels are computed, by retrieving and summing the products stored in the buffers.

Since redundant multiply-by-zero operations are mostly avoided, a convolution operation may be performed relatively quickly using this technique. For example, as described in detail below, for an example embodiment, using this technique, it may be possible to convolve the image of Table 1 with a 3×3 kernel in only nine clock cycles. Moreover, since the computation of the output is performed in parallel to the computation and storage of the products, any products that were already used to compute the output may be overwritten, such that the buffers need not be overly large.

Typically, the functionality described herein is implemented in hardware, such as on a graphics processing unit (GPU), field-programmable gate array (FPGA), or application-specific integrated circuit (ASIC) comprising one or more computational units, each of which is configured to perform convolution operations as described herein.

The present application mainly addresses the processing of images, such that the terms "pixel" and "value" may be used interchangeably. (For example, the expression "input pixel" may be used interchangeably with "input value.") It is noted, however, that the techniques for accelerated convolution described herein may be used for processing any relevant types of signals, including audio, video, speech, image, communication, geophysical, sonar, radar, medical, or musical signals. (As example of an audio signal to which the techniques described herein may be applied is a pulse-code modulation (PCM) encoded audio signal.) In the context of the present application, including the claims, the term "signal" may refer to any multivalued input or output, including, for example, any of the types of signals referred to above.

It is noted that the operation described above with reference to Table 1 is actually a cross-correlation operation, rather than a convolution operation. (In a "true" convolution operation, the direction of the kernel is reversed, prior to being passed over the input.) Nevertheless, in accordance with common parlance, the present application refers to this operation as a "convolution." In any case, it is noted that the embodiments described herein may be used for both convolution and cross-correlation operations.

Although the present application mainly addresses CNNs, it is noted that the circuitry described herein may be used for any suitable application, such as the convolution of a sparse matrix, which includes a large number of zeros, with a kernel.

System Description

Reference is initially made to FIG. 1, which is a schematic illustration of a system 20 for deep learning and inference, in accordance with some embodiments of the present invention. System 20 may be implemented on any suitable computing device, such as, for example, a desktop computer 22, comprising a processor 26 (comprising, for example, a central processing unit and random access memory) and a monitor 30.

System 20 implements a CNN, which is trained to perform an inference task. In the particular example shown in FIG. 1, this inference task includes an object-recognition task, whereby, given an image 32, system 20 recognizes, in image 32, any object 34 of a particular predetermined type. Following the performance of this task, image 32 may be displayed on monitor 30, with the recognized objects being circled or otherwise indicated in the image. Alternatively or additionally, system 20 may implement one or more other CNNs trained to perform any other suitable inference task, such as, for example, recognizing the voice of a particular individual in a PCM encoded sound signal.

The CNN functionality of system 20 may be implemented in software that is run by processor 26. Typically, however, this functionality is implemented in hardware, on at least one integrated circuit (IC) 24, such as a GPU, an FPGA, or an ASIC. IC 24 comprises one or more computational units 21, each of which comprises circuitry configured to perform convolution operations, as further described below with reference to FIG. 2. IC 24 may further comprise at least one oscillator 23, configured to clock the computational units. For example, as illustrated in FIG. 1, a single oscillator 23 may clock all of the computational units. Alternatively, the computational units may be clocked by separate respective oscillators belonging to IC 24.

In some embodiments, system 20 comprises a plurality of cooperatively networked, or otherwise connected, ICs 24, which may collectively implement a single CNN, or implement multiple different CNNs.

In general, system 20 may comprise any suitable input devices 31, such as a keyboard and/or a mouse, with which a user may select an inference task for system 20 to perform. System 20 may also comprise any output devices, such as an audio speaker, alternatively or additionally to monitor 30.

Convolution Circuitry

Figure 2:
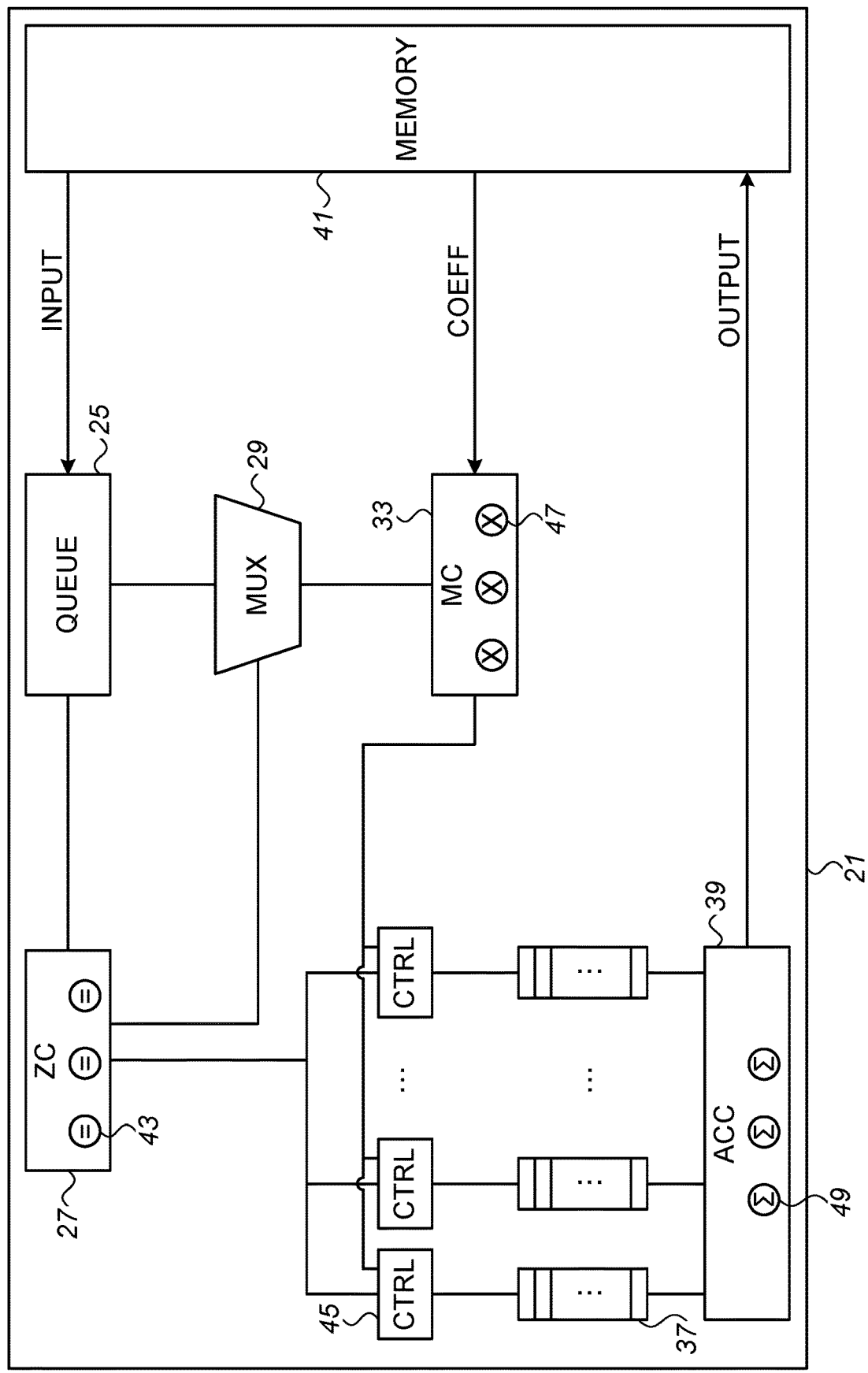
FIG. 2 is a schematic illustration of a computational unit comprising circuitry for performing a convolution operation, in accordance with some embodiments of the present invention.

Reference is now made to FIG. 2, which is a schematic illustration of a computational unit 21 comprising circuitry for performing a convolution operation on an input signal that includes a plurality of input values, in accordance with some embodiments of the present invention. Typically, the circuitry in computational unit 21 comprises one or more of the following components:

(i) Zero-comparison Circuitry (ZC) 27

ZC 27 is configured to compare each of the input values to zero, such as to identify any of the input values that are not zero-valued. Typically, ZC 27 comprises a plurality of comparators 43, such that, during each clock cycle of oscillator 23 (FIG. 1), ZC 27 may compare a plurality of the input values to zero, using a different respective comparator 43 for each of the input values. (FIG. 2 shows three comparators merely to indicate a plurality; in practice, ZC 27 may comprise any suitable number of comparators.)

(ii) Multiplier Circuitry (MC) 33

MC 33 is configured to compute the respective products of a plurality of convolution-kernel coefficients with each of the non-zero input values identified by ZC 27. MC 33 comprises a plurality of multipliers 47, which may have any suitable cardinality. For example, MC 33 may comprise W multipliers 47, where W is the number of kernel coefficients, each multiplier being configured to multiply the input value passed to MC 33 by a different respective one of the kernel coefficients. (Thus, during each clock cycle, the input value passed to MC 33 is multiplied by each one of the kernel coefficients.)

(iii) Buffers 37

One or more buffers 37 temporarily store the products computed by MC 33. Typically, computational unit 21 comprises a plurality of buffers 37, each buffer corresponding to a different respective coefficient of the kernel. In such embodiments, each of the products computed by MC 33 is stored in the buffer corresponding to the coefficient from which the product was computed. For example, the products of the coefficient at index (0,0) of the kernel may be stored in a first buffer 37, the products of the coefficient at index (0,1) may be stored in a second buffer 37, etc.

(It is noted that not all of the products computed by MC 33 are stored in buffers 37. For example, even though the product of a pixel having index (0,0)—i.e., the top-left corner pixel of the image—and a coefficient having index (2,2)—i.e., the bottom-right corner coefficient of a 3×3 kernel—may be computed by MC 33, this product is not stored in buffers 37, given that this product is not used to compute any output values.)

(iv) Controllers 45

Controllers (CTRL) 45 are configured to store products from MC 33, along with any other required values, in buffers 37. In some embodiments, a single controller 45 manages the storage into all of the buffers; in other embodiments, as illustrated in FIG. 2, a different respective controller 45 manages the storage into each one of the buffers. As described in detail in the following section of the present description, each controller 45 may, during each clock cycle, receive a respective product from MC 33, identify whether the product should be stored (as described immediately above), and then, in response to identifying that the product should be stored, store the product, along with any required zeros, in the buffer that is managed by the controller.

Typically, controllers 45 perform the storage into buffers 37 such that all of the stored values needed to compute a particular output value are stored at the same index of the buffers. For example, controllers 45 may store all of the values needed to compute the (0,0) output pixel at index 0 of the buffers, all of the values needed to compute the (0,1) output pixel at index 1 of the buffers, etc.

(v) Accumulator Circuitry (ACC) 39

ACC 39 is configured to compute the output values, by retrieving respective sets of stored values from buffers 37, and summing the retrieved sets. For example, during a given clock cycle, ACC 39 may compute the (0,0) output pixel, by retrieving the values stored at index 0 of the buffers, and then summing these values. Subsequently to computing a given output value, ACC 39 outputs the value. Advantageously, as further described below, ACC 39 may output at least some of the computed output values even before all of the input values are processed.

Typically, ACC 39 comprises a plurality of accumulators 49, having any suitable cardinality. Thus, during a given clock cycle, ACC 39 may compute a plurality of output values, by computing a different respective output value using each accumulator 49. Alternatively, ACC 39 may be clocked by a separate oscillator having a shorter period than oscillator 23, such that, even with a single accumulator, ACC 39 may compute several output values during a single clock cycle of oscillator 23.

In some embodiments, as shown in FIG. 2, computational unit 21 further comprises a queue 25 and a multiplexer (MUX) 29. The input values are successively loaded into queue 25. During each clock cycle, ZC 27 compares a given number of values in the queue to zero. Based on this comparison, ZC 27 controls multiplexer 29 such that multiplexer 29 passes one or more identified non-zero input values to MC 33. (As described in the section below, if a non-zero value is not identified, ZC 27 may cause a zero value to be passed to MC 33.) ZC 27 also notifies controllers 45 of any identified zero-valued inputs, such that controllers 45 may store the products from MC 33 (along with zeros corresponding to the zero-valued inputs) in the appropriate locations in buffers 37.

In some embodiments, as shown in FIG. 2, computational unit 21 further comprises a memory 41; alternatively, a single common memory 41 may be shared by a plurality of computational units. Memory 41 may store the input values from the signal that is to be convolved, these input values being retrieved, as needed, by queue 25. (As described above, this input may be received by memory 41 from a ReLU unit.) Alternatively or additionally, memory 41 may store the kernel coefficients (COEFF) for the convolution operation; these coefficients are retrieved from memory 41 by MC 33. Alternatively or additionally, memory 41 may store the outputs from ACC 39.

Notwithstanding the above, it is noted that the input values may be received directly, e.g., over a network, by queue 25 or ZC 27, such that there may be no need for memory 41 to store any input values. It is further noted that MC 33 may be configured to use particular predetermined kernel coefficients, such that there may be no need for memory 41 to store any kernel coefficients. Furthermore, ACC 39 may pass its output directly to whichever component operates on this output. Thus, in some embodiments, memory 41 may not be required at all.

Although computational unit 21 may be configured to perform convolution operations on input having more than two dimensions, typically, computational unit 21 performs a two-dimensional convolution, whereby a two-dimensional input is convolved with a two-dimensional kernel. Accordingly, to perform a multi-channel convolution operation, a plurality of computational units are used, whereby each computational unit convolves a single respective channel of the input with the corresponding channel of the kernel. Subsequently to each computational unit operating on its respective channel and generating a respective two-dimensional output, summation circuitry on IC 24 sums the two-dimensional outputs, thus generating the final result of the convolution operation.

The result of the convolution operation may be passed to processor 26, to one or more other computational units, or to any other relevant circuitry. For example, the result may be passed to a ReLU unit, which nullifies any negative values in the result. (Any other suitable operation may be performed on the result, before or after the ReLU operation; for example, a down-sampling operation may be performed after the ReLU operation.) Subsequently, the output of the ReLU unit may be passed to one or more other computational units 21, for performance of further convolution operations. Alternatively, the output may be passed to other circuitry (such as other circuitry on IC 24), or to processor 26, for performance of the desired inference task.

Notwithstanding the particular configuration shown in FIG. 2, it is noted that the scope of the present disclosure includes any suitable configuration of circuitry configured to perform convolution operations by iterating over the input values (and thus omitting most redundant multiply-by-zero operations), storing the products of the non-zero-valued input values and the kernel coefficients in one or more buffers, and computing the output values by retrieving and summing these products.

Operation of the Convolution Circuitry

The present portion of the description details the operation of computational unit 21. By way of example, it will be assumed that the convolution kernel is of size 3×3, and that computational unit 21 accordingly comprises nine buffers 37, each buffer corresponding to a different respective one of the coefficients. Each of the buffers will be indicated by the notation B(m,n), where (m,n) is the index of the corresponding kernel coefficient. For example, the buffer B(0,0) stores the products of the input values with the top-left corner coefficient of the kernel, which has the index (0,0).

First, by way of introduction, Table 2 below shows a schema that may be implemented by controllers 45 for storage in buffers 37, assuming that the input signal is of size 5×5.

TABLE 2

| Index | B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|---|
| 0 | 0 | 0 | 0 | 0 | P (0, 0) | P (0, 1) | 0 | P (1, 0) | P (1, 1) |
| 1 | 0 | 0 | 0 | P (0, 0) | P (0, 1) | P (0, 2) | P (1, 0) | P (1, 1) | P (1, 2) |
| 2 | 0 | 0 | 0 | P (0, 1) | P (0, 2) | P (0, 3) | P (1, 1) | P (1, 2) | P (1, 3) |
| 3 | 0 | 0 | 0 | P (0, 2) | P (0, 3) | P (0, 4) | P (1, 2) | P (1, 3) | P (1, 4) |
| 4 | 0 | 0 | 0 | P (0, 3) | P (0, 4) | 0 | P (1, 3) | P (1, 4) | 0 |
| 5 | 0 | P (0, 0) | P (0, 1) | 0 | P (1, 0) | P (1, 1) | 0 | P (2, 0) | P (2, 1) |
| 6 | P (0, 0) | P (0, 1) | P (0, 2) | P (1, 0) | P (1, 1) | P (1, 2) | P (2, 0) | P (2, 1) | P (2, 2) |
| 7 | P (0, 1) | P (0, 2) | P (0, 3) | P (1, 1) | P (1, 2) | P (1, 3) | P (2, 1) | P (2, 2) | P (2, 3) |
| 8 | P (0, 2) | P (0, 3) | P (0, 4) | P (1, 2) | P (1, 3) | P (1, 4) | P (2, 2) | P (2, 3) | P (2, 4) |
| 9 | P (0, 3) | P (0, 4) | 0 | P (1, 3) | P (1, 4) | 0 | P (2, 3) | P (2, 4) | 0 |
| 10 | 0 | P (1, 0) | P (1, 1) | 0 | P (2, 0) | P (2, 1) | 0 | P (3, 0) | P (3, 1) |
| 11 | P (1, 0) | P (1, 1) | P (1, 2) | P (2, 0) | P (2, 1) | P (2, 2) | P (3, 0) | P (3, 1) | P (3, 2) |
| 12 | P (1, 1) | P (1, 2) | P (1, 3) | P (2, 1) | P (2, 2) | P (2, 3) | P (3, 1) | P (3, 2) | P (3, 3) |
| 13 | P (1, 2) | P (1, 3) | P (1, 4) | P (2, 2) | P (2, 3) | P (2, 4) | P (3, 2) | P (3, 3) | P (3, 4) |
| 14 | P (1, 3) | P (1, 4) | 0 | P (2, 3) | P (2, 4) | 0 | P (3, 3) | P (3, 4) | 0 |
| 15 | 0 | P (2, 0) | P (2, 1) | 0 | P (3, 0) | P (3, 1) | 0 | P (4, 0) | P (4, 1) |
| 16 | P (2, 0) | P (2, 1) | P (2, 2) | P (3, 0) | P (3, 1) | P (3, 2) | P (4, 0) | P (4, 1) | P (4, 2) |
| 17 | P (2, 1) | P (2, 2) | P (2, 3) | P (3, 1) | P (3, 2) | P (3, 3) | P (4, 1) | P (4, 2) | P (4, 3) |
| 18 | P (2, 2) | P (2, 3) | P (2, 4) | P (3, 2) | P (3, 3) | P (3, 4) | P (4, 2) | P (4, 3) | P (4, 4) |
| 19 | P (2, 3) | P (2, 4) | 0 | P (3, 3) | P (3, 4) | 0 | P (4, 3) | P (4, 4) | 0 |
| 20 | 0 | P (3, 0) | P (3, 1) | 0 | P (4, 0) | P (4, 1) | 0 | 0 | 0 |
| 21 | P (3, 0) | P (3, 1) | P (3, 2) | P (4, 0) | P (4, 1) | P (4, 2) | 0 | 0 | 0 |

TABLE 2-continued

| Index | B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|---|
| 22 | P (3, 1) | P (3, 2) | P (3, 3) | P (4, 1) | P (4, 2) | P (4, 3) | 0 | 0 | 0 |
| 23 | P (3, 2) | P (3, 3) | P (3, 4) | P (4, 2) | P (4, 3) | P (4, 4) | 0 | 0 | 0 |
| 24 | P (3, 3) | P (3, 4) | 0 | P (4, 3) | P (4, 4) | 0 | 0 | 0 | 0 |

In accordance with this schema, controllers 45 store, at each given index of buffers 37, all of the addends that are needed to compute a particular output value. Each potentially non-zero addend is indicated by the notation P(i,j), where P(i,j) is the product of the relevant kernel coefficient with the input pixel having index (i,j). (As described above and further described below, a given product P(i,j) may not actually be computed, in the event that the input pixel at index (i,j) is zero-valued.) Table 2 assumes that controllers 45 effectively zero-pad the input image to handle convolution along the edges of the image, by storing a zero for any product that "lies outside the image."

For example, the first row of Table 2 contains the values stored in the respective first elements of the buffers, at index 0. These values include the products of the relevant kernel coefficients with their colocated pixels when the center of the kernel is colocated with the (0,0) pixel; thus, the sum of these values is the output value having index (0,0). For example, the value P(0,0) is at index 0 of buffer B(1,1), indicating that this buffer element stores the product of the (0,0) pixel of the image and the (1,1) coefficient—i.e., the center coefficient—of the kernel. B(0,0), B(0,1), B(0,2), B(1,0), and B(2,0) all store zeros, since, when the center of the kernel is colocated with the (0,0) pixel, the kernel coefficients corresponding to these buffers lie outside the image.

Similarly, the second row of Table 2 contains the values stored in the second element of each of the buffers, at index 1. These values include the products of the relevant kernel coefficients with their colocated pixels when the center of the kernel is colocated with the (0,1) pixel; thus, the sum of these values is the output value having index (0,1). For example, the value P(0,1) is at index 1 of buffer B(1,1), indicating that this buffer element stores the product of the (0,1) pixel of the image and the (1,1) coefficient the kernel. B(0,0), B(0,1), and B(0,2) all store zeros, since, when the center of the kernel is colocated with the (0,1) pixel, the kernel coefficients corresponding to these buffers (constituting the top row of the kernel) lie outside the image.

Further to this introduction, the operation of computational unit 21 will now be described, by simulating a convolution of the example image of Table 1 with a convolution kernel having coefficients {k(m,n)}. The convolution will be simulated by showing, for each clock cycle, a first table, representing the image, that indicates the input values that are processed during the clock cycle, and a second table, similar to Table 2, that shows the state of the buffers at the end of the clock cycle.

In the simulation below, it will be assumed that ZC 27 comprises five comparators 43, such that, during each clock cycle, ZC 27 may compare up to five input values with zero. It will further be assumed that a maximum of one input value may be multiplied by MC 33 during any given clock cycle, and that any input values that follow the multiplied input value are processed only during subsequent clock cycles. It will further be assumed that the input image is processed row-by-row, from left to right.

(Notwithstanding the above assumptions, it is noted that ZC 27 may comprise any suitable number of comparators, and that the pixels of the input image may be processed in any suitable order. Similarly, as further described below, MC 33 may be configured to multiply multiple input values during a single clock cycle; alternatively or additionally, zero values that follow a given multiplied input value may be processed during the same clock cycle as is the multiplied input value.)

(i) First Clock Cycle:

During the first clock cycle of oscillator 23, ZC 27 compares the first five input pixels stored in queue 25 to zero, using comparators 43. Based on this comparison, ZC 27 identifies that the first non-zero pixel in the queue is the second pixel of the input image, having a value of 100. In response to identifying this pixel, ZC 27 instructs MUX 29 to pass this pixel to MC 33. Upon receiving this pixel, MC 33 multiplies the pixel by the kernel coefficients, and passes the resulting products to controllers 45.

ZC 27 further notifies controllers 45 that one zero precedes the pixel value passed to MC 33, such that the controllers may store the products from MC 33, along with any required zero values, in the appropriate locations in buffers 37. Since the first pixel of the image is not passed to MC 33, this pixel is not multiplied by any of the kernel coefficients, such that redundant multiply-by-zero operations are avoided.

Following the processing of the first two pixels of the input image, the pixels in the queue that follow these two pixels move up in the queue, and two new pixels are retrieved from memory 41 by queue 25. A similar loading of queue 25 may occur during each subsequent clock cycle. Alternatively, queue 25 may be loaded in larger "bursts" during some, but not all, of the clock cycles, such that several consecutive clock cycles may pass without any loading of the queue.

Table 3 below shows the input image, with a single asterisk ("*") indicating those pixels that are compared to zero during the first clock cycle, and a double asterisk ("**") indicating those pixels that are further processed by the circuitry following the comparison.

TABLE 3

| 0** | 100** | 0* | 0* | 50* |
|---|---|---|---|---|
| 0 | 0 | 200 | 0 | 0 |
| 100 | 0 | 0 | 0 | 0 |
| 0 | 0 | 0 | 50 | 0 |
| 0 | 50 | 0 | 0 | 100 |

(As briefly noted above, in some embodiments, even pixels that follow the first non-zero pixel may be processed during the same clock cycle as is the first non-zero pixel. For example, assuming that MC 33 is configured to multiply up to two pixels during a single clock cycle, the first five pixels of the input image above may be processed during the first clock cycle. In other words, during the first clock cycle, in addition to performing the tasks described above, ZC 27 may instruct MUX 29 to pass the fifth pixel to MC 33, and may also notify controllers 45 of the two zero-values that precede this pixel.)

Upon receiving the products from MC 33, controllers 45 store the products, along with any required zeros, in buffers 37. Table 4 below shows the status of buffers 37 after this storage is performed. In Table 4, the notation k(m,n) indicates the coefficient of the convolution kernel at index (m,n), and, as in Table 2, the notation B(m,n) indicates the buffer that stores any products of k(m,n). Each product stored by controllers 45 during the first clock cycle is marked with an appended pound ("#") sign. Similarly, each zero that is stored in response to communication from ZC 27 is marked by an appended pound sign. (Other zeros, stored by the controllers for edge handling, are not marked with an appended pound sign.)

It is noted that Table 4 is derived from Table 2, in that each instance of "P(0,0)" in Table 2 is replaced with "0#," and each instance of "P(0,1)" is replaced with the appropriate product. (For simplicity, indices at which no values have yet been stored in any of the buffers are omitted from Table 4, and from the analogous tables below.)

Typically, to facilitate writing to buffers 37, each controller 45 maintains, for the buffer under its control, a "write index" ("WI") variable, which is assigned the value of the highest index at which the buffer has been populated. If the buffer is not populated at all, the buffer's WI may be assigned a value of −1, NULL, or any other suitable value indicating that the buffer has not yet been populated.

Similarly, to facilitate reading from buffers 37, controllers 45 and ACC 39 typically maintain a "read index" ("RI") variable, which is generally assigned the value of the lowest index at which all of the buffers are populated, but for which the buffers have not yet been summed. If no indices have been fully populated (such as at the end of the first clock cycle), RI may be assigned a value of −1, NULL, or any other suitable value. During each clock cycle, ACC 39 reads the RI variable, and then, assuming this variable is 0 or greater, sums as many indices as it can, beginning with RI, up to (and including) the minimum of the WI variables. Specific examples of this functionality are provided below.

During each of the subsequent clock cycles, ZC 27 similarly compares a subset of the input values to zero. In most of the clock cycles, as in the first clock cycle, ZC 27 identifies, based on this comparison, one or more zero-valued input values, and one or more non-zero-valued input values. (For example, ZC 27 may identify the first non-zero-valued input value in the subset, along with any preceding zeros.) Subsequently, MC 33 multiplies each of the identified non-zero-valued input values by the coefficients, without multiplying any of the identified zero-valued input values by any of the coefficients.

(ii) Second Clock Cycle:

During the second clock cycle, ZC 27 compares the third through seventh pixels of the input image to zero, identifies, based on this comparison, that the fifth pixel is non-zero, and then processes the third through fifth pixels. Table 5 shows the input image notated, as for Table 3, to indicate the pixels that are compared to zero and processed during the second clock cycle.

TABLE 5

| 0 | 100 | 0** | 0** | 50** |
|---|---|---|---|---|
| 0* | 0* | 200 | 0 | 0 |
| 100 | 0 | 0 | 0 | 0 |
| 0 | 0 | 0 | 50 | 0 |
| 0 | 50 | 0 | 0 | 100 |

Table 6 shows the state of the buffers following the second clock cycle, with a pound sign indicating those values that are stored in the buffers responsively to the input pixels processed during the second clock cycle.

TABLE 4

| B (0, 0) WI = 7 | B (0, 1) WI = 6 | B (0, 2) WI = 5 | B (1, 0) WI = 2 | B (1, 1) WI = 1 | B (1, 2) WI = 0 | B (2, 0) WI = −1 | B (2, 1) WI = −1 | B (2, 2) WI = −1 |
|---|---|---|---|---|---|---|---|---|
| 0 | 0 | 0 | 0 | 0# | k (1, 2) * 100# | | | |
| 0 | 0 | 0 | 0# | k (1, 1) * 100# | | | | |
| 0 | 0 | 0 | k (1, 0) * 100# | | | | | |
| 0 | 0 | 0 | | | | | | |
| 0 | 0 | 0 | | | | | | |
| 0 | 0# | k (0, 2) * 100# | | | | | | |
| 0# | k (0, 1) * 100# | | | | | | | |
| k (0, 0) * 100# | | | | | | | | |

TABLE 6

| B (0, 0) WI = 9 | B (0, 1) WI = 9 | B (0, 2) WI = 8 | B (1, 0) WI = 4 | B (1, 1) WI = 9 | B (1, 2) WI = 3 | B (2, 0) WI = −1 | B (2, 1) WI = −1 | B (2, 2) WI = −1 |
|---|---|---|---|---|---|---|---|---|
| 0 | 0 | 0 | 0 | 0 | k (1, 2) * 100 | | | |
| 0 | 0 | 0 | 0 | k (1, 1) * 100 | 0# | | | |
| 0 | 0 | 0 | k (1, 0) * 100 | 0# | 0# | | | |
| 0 | 0 | 0 | 0# | 0# | k (1, 2) * 50# | | | |
| 0 | 0 | 0 | 0# | k (1, 1) * 50# | | | | |
| 0 | 0 | k (0, 2) * 100 | | | | | | |
| 0 | k (0, 1) * 100 | 0# | | | | | | |
| k (0, 0) * 100 | 0# | 0# | | | | | | |
| 0# | 0# | k (0, 2) * 50# | | | | | | |
| 0# | k (0, 1) * 50# | | | | | | | |

(iii) Third Clock Cycle:

Table 7 indicates the input pixels compared and processed during the third clock cycle.

TABLE 7

| | | | | |
|---|---|---|---|---|
| 0 | 100 | 0 | 0 | 50 |
| 0** | 0** | 200** | 0* | 0* |
| 100 | 0 | 0 | 0 | 0 |
| 0 | 0 | 0 | 50 | 0 |
| 0 | 50 | 0 | 0 | 100 |

Table 8 shows the state of the buffers following the third clock cycle. During the third clock cycle, RI is set to 0, following the full population of the 0 index of the buffers.

TABLE 8

| B (0, 0) WI = 13 | B (0, 1) WI = 12 | B (0, 2) WI = 11 | B (1, 0) WI = 8 | B (1, 1) WI = 7 | B (1, 2) WI = 6 | B (2, 0) WI = 3 | B (2, 1) WI = 2 | B (2, 2) WI = 1 |
|---|---|---|---|---|---|---|---|---|
| 0 | 0 | 0 | 0 | 0 | k (1, 2) * 100 | 0 | 0# | 0# |
| 0 | 0 | 0 | 0 | k (1, 1) * 100 | 0 | 0# | 0# | k (2, 2) * 200# |
| 0 | 0 | 0 | k (1, 0) * 100 | 0 | 0 | 0# | k (2, 1) * 200# | |
| 0 | 0 | 0 | 0 | 0 | k (1, 2) * 50 | k (2, 0) * 200# | | |
| 0 | 0 | 0 | 0 | k (1, 1) * 50 | 0 | | | |
| 0 | 0 | k (0, 2) * 100 | 0 | 0# | 0# | | | |
| 0 | k (0, 1) * 100 | 0 | 0# | 0# | k (1, 2) * 200# | | | |
| k (0, 0) * 100 | 0 | 0 | 0# | k (1, 1) * 200# | | | | |
| 0 | 0 | k (0, 2) * 50 | k (1, 0) * 200# | | | | | |
| 0 | k (0, 1) * 50 | 0 | | | | | | |
| 0 | 0# | 0# | | | | | | |
| 0# | 0# | k (0, 2) * 200# | | | | | | |
| 0# | k (0, 1) * 200# | | | | | | | |
| k (0, 0) * 200# | | | | | | | | |

(iv) Fourth Clock Cycle:

Table 9 indicates the input pixels compared and processed during the fourth clock cycle.

TABLE 9

| | | | | |
|---|---|---|---|---|
| 0 | 100 | 0 | 0 | 50 |
| 0 | 0 | 200 | 0 | 0 |
| 100** | 0* | 0* | 0 | 0 |
| 0 | 0 | 0 | 50 | 0 |
| 0 | 50 | 0 | 0 | 100 |

Table 10, below, shows the state of the buffers at the end of the fourth clock cycle.

During the fourth clock cycle, ACC 39 reads the RI variable, thus identifying that this variable has a value of 0.

ACC 39 further reads the WI variables, and computes the minimum of these variables (as of the end of the third clock cycle), i.e., 1. In response, ACC 39 computes two sums: a sum of the values stored in the buffers at index 0 (i.e., a sum across the first row of Table 10), and a sum of the values stored at index (i.e., a sum across the second row of Table 10). ACC 39 further outputs each of these sums to memory 41, or directly to another computational unit, ReLU circuitry, or any other suitable destination. These output values are then further processed by the CNN, such that, ultimately, processor 26 (or any other processor, such as another processor on IC 24) performs the required inference task based on these output values.

In Table 10, along with each of the other analogous tables below, each row that is summed during the clock cycle to which the table corresponds is marked by a double exclamation sign ("!!") at the beginning of the row, while each row that was summed during a previous clock cycle is marked by a single exclamation sign ("!").

TABLE 10

| B (0, 0) WI = 16 | B (0, 1) WI = 15 | B (0, 2) WI = 13 | B (1, 0) WI = 11 | B (1, 1) WI = 10 | B (1, 2) WI = 8 | B (2, 0) WI = 6 | B (2, 1) WI = 5 | B (2, 2) WI = 3 |
|---|---|---|---|---|---|---|---|---|
| !!0 | 0 | 0 | 0 | 0 | k (1, 2) * 100 | 0 | 0 | 0 |
| !!0 | 0 | 0 | 0 | k (1, 1) * 100 | 0 | 0 | 0 | k (2, 2) * 200 |
| 0 | 0 | 0 | k (1, 0) * 100 | 0 | 0 | 0 | k (2, 1) * 200 | 0# |
| 0 | 0 | 0 | 0 | 0 | k (1, 2) * 50 | k (2, 0) * 200 | 0# | 0# |
| 0 | 0 | 0 | 0 | k (1, 1) * 50 | 0 | 0# | 0# | |
| 0 | 0 | k (0, 2) * 100 | 0 | 0 | 0 | 0 | k (2, 1) * 100# | |
| 0 | k (0, 1) * 100 | 0 | 0 | 0 | k (1, 2) * 200 | k (2, 0) * 100# | | |
| k (0, 0) * 100 | 0 | 0 | 0 | k (1, 1) * 200 | 0# | | | |
| 0 | 0 | k (0, 2) * 50 | k (1, 0) * 200 | 0# | 0# | | | |
| 0 | k (0, 1) * 50 | 0 | 0# | 0# | | | | |
| 0 | 0 | 0 | 0 | k (1, 1) * 100# | | | | |
| 0 | 0 | k (0, 2) * 200 | k (1, 0) * 100# | | | | | |
| 0 | k (0, 1) * 200 | 0# | | | | | | |
| k (0, 0) * 200 | 0# | 0# | | | | | | |
| 0# | 0# | | | | | | | |
| 0 | k (0, 1) * 100# | | | | | | | |
| k (0, 0) * 100# | | | | | | | | |

Following the summations performed by ACC 39, the RI variable is updated to 2.

(v) Fifth Clock Cycle:

Table 11 indicates the input pixels compared and processed during the fifth clock cycle.

TABLE 11

| 0 | 100 | 0 | 0 | 50 |
|---|---|---|---|---|
| 0 | 0 | 200 | 0 | 0 |
| 100 | 0 | 0 | 0 | 0 |

TABLE 11-continued

| 0** | 0 | 0 | 50 | 0 |
|---|---|---|---|---|
| 0 | 50 | 0 | 0 | 100 |

As shown in Table 11, during the fifth clock cycle, ZC 27 does not identify any non-zero input pixels. Nonetheless, ZC 27 may instruct MUX 29 to pass the fifth compared pixel to MC 33, and inform the controllers of the preceding four zeros, as if the fifth pixel were non-zero-valued. Although, as a result, several redundant multiplication operations are performed, this functionality allows for greater ease of manufacture, in that the convolution circuitry need not be configured to operate differently in the event that no non-zero input pixels are found. (Notwithstanding the above, in some embodiments, the convolution circuitry is configured such that if no non-zero input pixels are found during a particular clock cycle, ZC 27 simply informs the controllers of this fact, and does not instruct MUX 29 to pass any pixels to MC 33.)

During the fifth clock cycle, ACC 39 reads the RI value of 2, and computes the minimum of WI (as of the end of the fourth clock cycle), i.e., 3. In response, ACC 39 sums the third and fourth indices of the buffers.

Table 12 shows the state of the buffers at the end of the fifth clock cycle, assuming that the fifth (zero-valued) pixel is multiplied by the kernel coefficients, as described above. (For simplicity, Table 12, and each of the similar tables below, omits the WI values; similarly, no explicit mention of the RI value is made for the clock cycles described below.)

TABLE 12

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| !0 | 0 | 0 | 0 | 0 | k (1, 2) * 100 | 0 | 0 | 0 |
| !0 | 0 | 0 | 0 | k (1, 1) * 100 | 0 | 0 | 0 | k (2, 2) * 200 |
| !!0 | 0 | 0 | k (1, 0) * 100 | 0 | 0 | 0 | k (2, 1) * 200 | 0 |
| !!0 | 0 | 0 | 0 | 0 | k (1, 2) * 50 | k (2, 0) * 200 | 0 | 0 |
| 0 | 0 | 0 | 0 | k (1, 1) * 50 | 0 | 0 | 0 | 0 |
| 0 | 0 | k (0, 2) * 100 | 0 | 0 | 0 | 0 | k (2, 1) * 100 | 0# |
| 0 | k (0, 1) * 100 | 0 | 0 | 0 | k (1, 2) * 200 | k (2, 0) * 100 | 0# | 0# |
| k (0, 0) * 100 | 0 | 0 | 0 | k (1, 1) * 200 | 0 | 0# | 0# | 0# |
| 0 | 0 | k (0, 2) * 50 | k (1, 0) * 200 | 0 | 0 | 0# | 0# | 0# |
| 0 | k (0, 1) * 50 | 0 | 0 | 0 | 0 | 0# | 0# | |
| 0 | 0 | 0 | 0 | k (1, 1) * 100 | 0# | 0 | k (2, 1) * 0# | |
| 0 | 0 | k (0, 2) * 200 | k (1, 0) * 100 | 0# | 0# | k (2, 0) * 0# | | |
| 0 | k (0, 1) * 200 | 0 | 0# | 0# | 0# | | | |
| k (0, 0) * 200 | 0 | 0 | 0# | 0# | | | | |
| 0 | 0 | 0 | 0# | 0# | | | | |
| 0 | k (0, 1) * 100 | 0# | 0 | k (1, 1) * 0# | | | | |
| k (0, 0) * 100 | 0# | 0# | k (1, 0) * 0# | | | | | |
| 0# | 0# | 0# | | | | | | |
| 0# | 0# | 0# | | | | | | |
| 0# | 0# | | | | | | | |
| 0 | k (0, 1) * 0# | | | | | | | |
| k (0, 0) * 0# | | | | | | | | |

(vi) Sixth Clock Cycle:

Table 13 indicates the input pixels compared and processed during the sixth clock cycle.

TABLE 13

| 0 | 100 | 0 | 0 | 50 |
|---|---|---|---|---|
| 0 | 0 | 200 | 0 | 0 |
| 100 | 0 | 0 | 0 | 0 |
| 0 | 0** | 0** | 50** | 0* |
| 0* | 50 | 0 | 0 | 100 |

Table 14 shows the state of the buffers at the end of the sixth clock cycle.

TABLE 14

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| !0 | 0 | 0 | 0 | 0 | k (1, 2) * 100 | 0 | 0 | 0 |
| !0 | 0 | 0 | 0 | k (1, 1) * 100 | 0 | 0 | 0 | k (2, 2) * 200 |
| !0 | 0 | 0 | k (1, 0) * 100 | 0 | 0 | 0 | k (2, 1) * 200 | 0 |
| !0 | 0 | 0 | 0 | 0 | k (1, 2) * 50 | k (2, 0) * 200 | 0 | 0 |
| !!0 | 0 | 0 | 0 | k (1, 1) * 50 | 0 | 0 | 0 | 0 |
| !!0 | 0 | k (0, 2) * 100 | 0 | 0 | 0 | 0 | k (2, 1) * 100 | 0 |
| !!0 | k (0, 1) * 100 | 0 | 0 | 0 | k (1, 2) * 200 | k (2, 0) * 100 | 0 | 0 |
| !!k (0, 0) * 100 | 0 | 0 | 0 | k (1, 1) * 200 | 0 | 0 | 0 | 0 |
| !!0 | 0 | k (0, 2) * 50 | k (1, 0) * 200 | 0 | 0 | 0 | 0 | 0 |

TABLE 14-continued

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| 0 | k (0, 1) * 50 | 0 | 0 | 0 | 0 | 0 | 0 | 0 |
| 0 | 0 | 0 | 0 | k (1, 1) * 100 | 0 | 0 | k (2, 1) * 0 | 0# |
| 0 | 0 | k (0, 2) * 200 | k (1, 0) * 100 | 0 | 0 | k (2, 0) * 0 | 0# | 0# |
| 0 | k (0, 1) * 200 | 0 | 0 | 0 | 0 | 0# | 0# | k (2, 2) * 50# |
| k (0, 0) * 200 | 0 | 0 | 0 | 0 | 0 | 0# | k (2, 1) * 50# | |
| 0 | 0 | 0 | 0 | 0 | 0 | k (2, 0) * 50# | | |
| 0 | k (0, 1) * 100 | 0 | 0 | k (1, 1) * 0 | 0# | | | |
| k (0, 0) * 100 | 0 | 0 | k (1, 0) * 0 | 0# | 0# | | | |
| 0 | 0 | 0 | 0# | 0# | k (1, 2) * 50# | | | |
| 0 | 0 | 0 | 0# | k (1, 1) * 50# | | | | |
| 0 | 0 | 0 | k (1, 0) * 50# | | | | | |
| 0 | k (0, 1) * 0 | 0# | | | | | | |
| k (0, 0) * 0 | 0# | 0# | | | | | | |
| 0# | 0# | k (0, 2) * 50# | | | | | | |
| 0# | k (0, 1) * 50# | | | | | | | |
| k (0, 0) * 50# | | | | | | | | |

(vii) Seventh Clock Cycle:

Table 15 indicates the input pixels compared and processed during the seventh clock cycle.

TABLE 15

| 0 | 100 | 0 | 0 | 50 |
|---|---|---|---|---|
| 0 | 0 | 200 | 0 | 0 |
| 100 | 0 | 0 | 0 | 0 |
| 0 | 0 | 0 | 50 | 0** |
| 0** | 50** | 0 | 0 | 100 |

Table 16 shows the state of the buffers at the end of the seventh clock cycle.

TABLE 16

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| !0 | 0 | 0 | 0 | 0 | k (1, 2) * 100 | 0 | 0 | 0 |
| !0 | 0 | 0 | 0 | k (1, 1) * 100 | 0 | 0 | 0 | k (2, 2) * 200 |
| !0 | 0 | 0 | k (1, 0) * 100 | 0 | 0 | 0 | k (2, 1) * 200 | 0 |
| !0 | 0 | 0 | 0 | 0 | k (1, 2) * 50 | k (2, 0) * 200 | 0 | 0 |
| !0 | 0 | 0 | 0 | k (1, 1) * 50 | 0 | 0 | 0 | 0 |
| !0 | 0 | k (0, 2) * 100 | 0 | 0 | 0 | 0 | k (2, 1) * 100 | 0 |
| !0 | k (0, 1) * 100 | 0 | 0 | 0 | k (1, 2) * 200 | k (2, 0) * 100 | 0 | 0 |
| !k (0, 0) * 100 | 0 | 0 | 0 | k (1, 1) * 200 | 0 | 0 | 0 | 0 |
| !0 | 0 | k (0, 2) * 50 | k (1, 0) * 200 | 0 | 0 | 0 | 0 | 0 |
| !!0 | k (0, 1) * 50 | 0 | 0 | 0 | 0 | 0 | 0 | 0 |
| !!0 | 0 | 0 | 0 | k (1, 1) * 100 | 0 | 0 | k (2, 1) * 0 | 0 |
| !!0 | 0 | k (0, 2) * 200 | k (1, 0) * 100 | 0 | 0 | k (2, 0) * 0 | 0 | 0 |
| !!0 | k (0, 1) * 200 | 0 | 0 | 0 | 0 | 0 | 0 | k (2, 2) * 50 |
| k (0, 0) * | 0 | 0 | 0 | 0 | 0 | 0 | k (2, 1) * | 0# |

TABLE 16-continued

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| 200 |  |  |  |  |  |  | 50 |  |
| 0 | 0 | 0 | 0 | 0 | 0 | k (2, 0) * 50 | 0# | 0 |
| 0 | k (0, 1) * 100 | 0 | 0 | k (1, 1) * 0 | 0 | 0 | 0# | k (2, 2) * 50# |
| k (0, 0) * 100 | 0 | 0 | k (1, 0) * 0 | 0 | 0 | 0# | k (2, 1) * 50# | |
| 0 | 0 | 0 | 0 | 0 | k (1, 2) * 50 | k (2, 0) * 50# | | |
| 0 | 0 | 0 | 0 | k (1, 1) * 50 | 0# | | | |
| 0 | 0 | 0 | k (1, 0) * 50 | 0# | 0 | | | |
| 0 | k (0, 1) * 0 | 0 | 0 | 0# | k (1, 2) * 50# | | | |
| k (0, 0) * 0 | 0 | 0 | 0# | k (1, 1) * 50# | | | | |
| 0 | 0 | k (0, 2) * 50 | k (1, 0) * 50# | | | | | |
| 0 | k (0, 1) * 50 | 0# | | | | | | |
| k (0, 0) * 50 | 0# | | | | | | | |

(vii) Eighth Clock Cycle:

Table 17 indicates the input pixels compared and processed during the eighth clock cycle.

TABLE 17

| 0 | 100 | 0 | 0 | 50 |
| 0 | 0 | 200 | 0 | 0 |
| 100 | 0 | 0 | 0 | 0 |

TABLE 17-continued

| 0 | 0 | 0 | 50 | 0 |
| 0 | 50 | 0** | 0** | 100** |

Table 18 shows the state of the buffers at the end of the eighth clock cycle. (During the eighth clock cycle, ZC 27 informs the controllers that no further input values are forthcoming, and the controllers therefore populate the buffers with the remaining zeros for edge-handling.)

TALBE 18

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| !0 | 0 | 0 | 0 | 0 | k (1, 2) * 100 | 0 | 0 | 0 |
| !0 | 0 | 0 | 0 | k (1, 1) * 100 | 0 | 0 | 0 | k (2, 2) * 200 |
| !0 | 0 | 0 | k (1, 0) * 100 | 0 | 0 | 0 | k (2, 1) * 200 | 0 |
| !0 | 0 | 0 | 0 | 0 | k (1, 2) * 50 | k (2, 0) * 200 | 0 | 0 |
| !0 | 0 | 0 | 0 | k (1, 1) * 50 | 0 | 0 | 0 | 0 |
| !0 | 0 | k (0, 2) * 100 | 0 | 0 | 0 | 0 | k (2, 1) * 100 | 0 |
| !0 | k (0, 1) * 100 | 0 | 0 | 0 | k (1, 2) * 200 | k (2, 0) * 100 | 0 | 0 |
| !k (0, 0) * 100 | 0 | 0 | 0 | k (1, 1) * 200 | 0 | 0 | 0 | 0 |
| !0 | 0 | k (0, 2) * 50 | k (1, 0) * 200 | 0 | 0 | 0 | 0 | 0 |
| !0 | k (0, 1) * 50 | 0 | 0 | 0 | 0 | 0 | 0 | 0 |
| !0 | 0 | 0 | 0 | k (1, 1) * 100 | 0 | 0 | k (2, 1) * 0 | 0 |
| !0 | 0 | k (0, 2) * 200 | k (1, 0) * 100 | 0 | 0 | k (2, 0) * 0 | 0 | 0 |
| !0 | k (0, 1) * 200 | 0 | 0 | 0 | 0 | 0 | 0 | k (2, 2) * 50 |
| !!k (0, 0) * 200 | 0 | 0 | 0 | 0 | 0 | 0 | k (2, 1) * 50 | 0 |
| !!0 | 0 | 0 | 0 | 0 | 0 | k (2, 0) * 50 | 0 | 0 |
| !!0 | k (0, 1) * 100 | 0 | 0 | k (1, 1) * 0 | 0 | 0 | 0 | k (2, 2) * 50 |
| k (0, 0) * 100 | 0 | 0 | k (1, 0) * 0 | 0 | 0 | 0 | k (2, 1) * 50 | 0# |

TALBE 18-continued

| B (0, 0) | B (0, 1) | B (0, 2) | B (1, 0) | B (1, 1) | B (1, 2) | B (2, 0) | B (2, 1) | B (2, 2) |
|---|---|---|---|---|---|---|---|---|
| 0 | 0 | 0 | 0 | 0 | k (1, 2) * 50 | k (2, 0) * 50 | 0# | 0# |
| 0 | 0 | 0 | 0 | k (1, 1) * 50 | 0 | 0# | 0# | k (2, 2) * 100# |
| 0 | 0 | 0 | k (1, 0) * 50 | 0 | 0 | 0# | k (2, 1) * 100# | 0 |
| 0 | k (0, 1) * 0 | 0 | 0 | 0 | k (1, 2) * 50 | 0 | 0 | 0 |
| k (0, 0) * 0 | 0 | 0 | 0 | k (1, 1) * 50 | 0# | 0 | 0 | 0 |
| 0 | 0 | k (0, 2) * 50 | k (1, 0) * 50 | 0# | 0# | 0 | 0 | 0 |
| 0 | k (0, 1) * 50 | 0 | 0# | 0# | k (1, 2) * 100# | 0 | 0 | 0 |
| k (0, 0) * 50 | 0 | 0 | 0# | k (1, 1) * 100# | 0 | 0 | 0 | 0 |

(ix) Ninth Clock Cycle:

During the ninth clock cycle, no further input pixels are processed. Rather, the remaining output values are computed by ACC 39, by summing the final nine rows of Table 18. Thus, after only nine clock cycles, the convolution operation is complete.

It is noted that the example above is provided by way of illustration only, and that the precise manner in which the circuitry operates may vary from the above, e.g., with respect to the timing of the various read and write operations that are performed. (Thus, it is possible, for example, that the convolution of a 5×5 signal might require 8 or 10 clock cycles, rather than 9 clock cycles.)

In the example above, controllers 45 do not overwrite any of the stored values that were already retrieved by ACC 39. In other cases, the number of elements in each of the buffers may be less than the number of the output values, and controllers 45 may, in storing the products received from MC 33 for one or more of the input values, overwrite other products that were previously stored by the controllers (and were already used by ACC 39). For example, the controllers may, in storing the products, continually cycle through each of the buffers. (Thus, each of the buffers may be described as a "cyclic buffer.") Advantageously, this functionality allows the buffers to be smaller than would otherwise be possible.

For example, given N pixels in the output image, each of the buffers may be of length L, where L<N. In such a case, addends for the L+$1^{st}$ output pixel may be stored at the first index of the buffers, addends for the L+$2^{nd}$ output pixel may be stored at the second index of the buffers, etc., thus overwriting any values at these indices that were already used by ACC 39. ACC 39 is configured to interpret the RI and WI variables accordingly. For example, in response to an RI value of L−1 and a minimum WI value of 1, ACC 39 may sum each of the L−$^{st}$, $0^{th}$, and $1^{st}$ indices of the buffers, thus computing three output values.

For embodiments in which the buffers are cyclic (as described immediately above), the controllers are configured to pause the operation of ZC 27 and MC 33, by instructing ZC 27 not to perform any comparisons for one or more clock cycles, in response to the maximum WI reaching a threshold distance from RI. This helps prevent the controllers from overwriting values that were not yet read by ACC 39.

It will be appreciated by persons skilled in the art that the present invention is not limited to what has been particularly shown and described hereinabove. Rather, the scope of embodiments of the present invention includes both combinations and subcombinations of the various features described hereinabove, as well as variations and modifications thereof that are not in the prior art, which would occur to persons skilled in the art upon reading the foregoing description. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   one or more buffers; and
   circuitry, configured to:
      process a plurality of input values, by:
         identifying each of the input values that is not zero-valued, and
         for each value of the identified input values, computing respective products of coefficients of a kernel with the value, and storing at least some of the respective products in the buffers,
      compute a plurality of output values, by:
         retrieving respective sets of stored values from the buffers, at least some of the retrieved sets including one or more of the products, and
         summing the retrieved sets, and
      output the computed output values,
   wherein the circuitry is configured to output at least some of the computed output values before processing all of the input values.

2. The system according to claim 1, wherein the circuitry is configured to, in response to a given one of the input values being zero-valued, store a plurality of zeros in the buffers, without multiplying the given one of the input values by any of the coefficients.

3. The system according to claim 2, further comprising an oscillator configured to clock the circuitry, wherein the circuitry comprises:
   zero-comparison circuitry, configured to, during a given clock cycle of the oscillator:
      compare a subset of the input values to zero, and
      based on the comparing, identify, in the subset, one or more zero-valued input values, and one or more non-zero-valued input values; and
   multiplier circuitry, configured to, during the given clock cycle, multiply each of the non-zero-valued input values by the coefficients, without multiplying any of the zero-valued input values by any of the coefficients.

4. The system according to claim 1, wherein each buffer of the buffers corresponds to a different respective coefficient of the coefficients, and wherein the circuitry is configured to store each product of the at least some of the respective products in the buffer corresponding to the coefficient from which the product was computed.

5. The system according to claim 4, wherein a number of elements in each of the buffers is less than a number of the output values, and wherein the circuitry is configured to, in storing the at least some of the respective products for one or more of the input values, overwrite other products that were previously stored by the circuitry.

6. The system according to claim 4, further comprising an oscillator configured to clock the circuitry, wherein the circuitry comprises accumulator circuitry configured to, during a given clock cycle of the oscillator:
retrieve at least one of the sets of stored values from the buffers, by retrieving each of the stored values that is stored at a particular index of a respective one of the buffers, and
compute at least one of the output values, by summing the retrieved one of the sets.

7. The system according to claim 1, wherein each of the input values is derived from an output of a rectified linear unit (ReLU).

8. The system according to claim 1, further comprising a processor configured to perform a machine-learned inference task based on the output values.

9. The system according to claim 8, wherein the inference task includes an object-recognition task.

10. A method, comprising:
using circuitry, processing a plurality of input values, by:
identifying each of the input values that is not zero-valued, and
for each value of the identified input values, computing respective products of coefficients of a kernel with the value, and storing at least some of the respective products in one or more buffers;
computing a plurality of output values, by:
retrieving respective sets of stored values from the buffers, at least some of the retrieved sets including one or more of the products, and
summing the retrieved sets; and
outputting the computed output values,
wherein outputting the computed output values comprises outputting at least some of the computed output values before processing all of the input values.

11. The method according to claim 10, further comprising, in response to a given one of the input values being zero-valued, storing a plurality of zeros in the buffers, without multiplying the given one of the input values by any of the coefficients.

12. The method according to claim 11,
wherein an oscillator clocks the circuitry, and
wherein processing the input values comprises, during a given clock cycle of the oscillator:
comparing a subset of the input values to zero;
based on the comparing, identifying, in the subset, one or more zero-valued input values, and one or more non-zero-valued input values; and
multiplying each of the non-zero-valued input values by the coefficients, without multiplying any of the zero-valued input values by any of the coefficients.

13. The method according to claim 10, wherein each buffer of the buffers corresponds to a different respective coefficient of the coefficients, and wherein storing the at least some of the respective products in the buffers comprises storing each product of the at least some of the respective products in the buffer corresponding to the coefficient from which the product was computed.

14. The method according to claim 13, wherein a number of elements in each of the buffers is less than a number of the input values, and wherein storing the at least some of the respective products, for one or more of the input values, comprises overwriting other products that were previously stored by the circuitry.

15. The method according to claim 13,
wherein an oscillator clocks the circuitry, and
wherein computing the output values comprises, during a given clock cycle of the oscillator:
retrieving at least one of the sets of stored values from the buffers, by retrieving each of the stored values that is stored at a particular index of a respective one of the buffers, and
computing at least one of the output values, by summing the retrieved one of the sets.

16. The method according to claim 10, wherein each of the input values is derived from an output of a rectified linear unit (ReLU).

17. The method according to claim 10, further comprising performing a machine-learned inference task based on the output values.

18. The method according to claim 17, wherein performing the inference task comprises recognizing an object in an image.

* * * * *